(12) United States Patent
Decoux et al.

(10) Patent No.: US 8,935,049 B2
(45) Date of Patent: Jan. 13, 2015

(54) PLANE TRACTOR

(75) Inventors: Laurent Decoux, Reffannes (FR); Eric Enault, Reffannes (FR); Nicholas Vermalle, Reffannes (FR)

(73) Assignee: Israel Aerospace Industries Ltd., Lod (IL)

( * ) Notice: Subject to any disclaimer, the term of this patent is extended or adjusted under 35 U.S.C. 154(b) by 0 days.

(21) Appl. No.: 13/578,907

(22) PCT Filed: Feb. 15, 2011

(86) PCT No.: PCT/IB2011/050626
§ 371 (c)(1),
(2), (4) Date: Aug. 14, 2012

(87) PCT Pub. No.: WO2011/101782
PCT Pub. Date: Aug. 25, 2011

(65) Prior Publication Data
US 2012/0310482 A1 Dec. 6, 2012

(30) Foreign Application Priority Data

Feb. 16, 2010 (FR) ..................................... 10 51078
Apr. 27, 2010 (FR) ..................................... 10 53232

(51) Int. Cl.
*B64F 1/10* (2006.01)
*B62D 6/00* (2006.01)
*B64F 1/22* (2006.01)

(52) U.S. Cl.
CPC . *B64F 1/22* (2013.01); *Y02T 50/826* (2013.01)
USPC .......................................................... 701/41

(58) Field of Classification Search
CPC ................................ B64F 1/22; Y02T 50/826

USPC ........................................................... 701/41
See application file for complete search history.

(56) References Cited

U.S. PATENT DOCUMENTS

| | | | |
|---|---|---|---|
| 2,539,010 | A | 1/1951 | Cox |
| 2,751,990 | A | 6/1956 | Finlay et al. |
| 2,877,911 | A | 3/1959 | Arnot |
| 2,957,650 | A | 10/1960 | Hornan et al. |
| 2,966,222 | A | 12/1960 | Lambert, Jr. |

(Continued)

FOREIGN PATENT DOCUMENTS

| | | |
|---|---|---|
| CN | 2458238 Y | 11/2001 |
| CN | 1511759 A | 7/2004 |

(Continued)

OTHER PUBLICATIONS

International Search Report from International Application No. PCT/IL2012/050357 mailed Mar. 11, 2013.

(Continued)

*Primary Examiner* — Mary Cheung
*Assistant Examiner* — Anne Mazzara
(74) *Attorney, Agent, or Firm* — Dorsey & Whitney LLP

(57) ABSTRACT

A plane tractor that grips a nose gear of a plane is disclosed, which includes: a chassis; wheel modules connected to the chassis, with each wheel module including at least one actuator for inducing a vertical movement of the wheel module in relation to the chassis; a gripping platform for gripping the nose gear of a plane, with the platform together with the chassis having freedom of movement substantially in circular translation; and a damping and actuating means connecting the platform and the chassis.

11 Claims, 10 Drawing Sheets

(56) References Cited

U.S. PATENT DOCUMENTS

Figure 1:
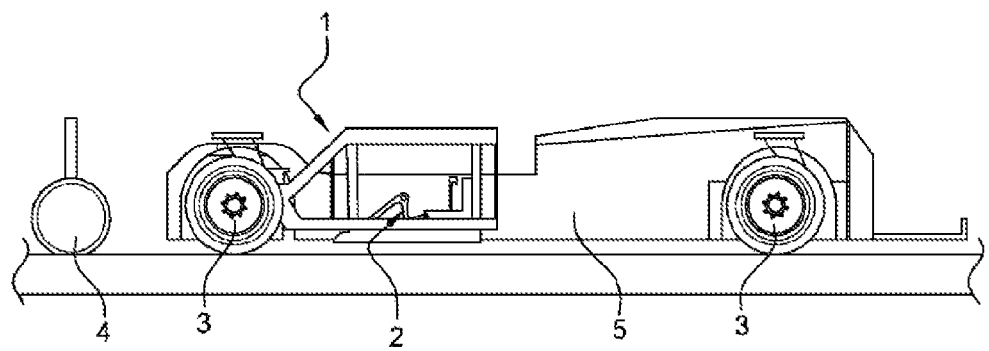

| | | | |
|---|---|---|---|
| 3,004,773 A | 10/1961 | Ankeney |
| 3,064,746 A | 11/1962 | Williamson et al. |
| 3,166,141 A | 1/1965 | Shields |
| 3,279,722 A | 10/1966 | Glover, Jr. et al. |
| 3,586,187 A | 6/1971 | Wright |
| 4,007,890 A | 2/1977 | Bremer et al. |
| 4,036,384 A | 7/1977 | Johnson |
| 4,113,041 A | 9/1978 | Birkeholm |
| 4,122,960 A | 10/1978 | Bauer et al. |
| 4,225,279 A | 9/1980 | Boyer |
| 4,237,994 A | 12/1980 | McColl |
| 4,375,244 A | 3/1983 | Morin |
| 4,482,961 A | 11/1984 | Kilner et al. |
| 4,618,161 A | 10/1986 | McNeill |
| 4,632,625 A | 12/1986 | Schuller et al. |
| 4,658,924 A | 4/1987 | Dobbie |
| 4,730,685 A | 3/1988 | Sinkkonen |
| 4,745,410 A | 5/1988 | Schuller et al. |
| 4,810,157 A | 3/1989 | Schopf |
| 4,836,734 A | 6/1989 | Pollner et al. |
| 4,842,220 A | 6/1989 | Versteeg |
| 4,911,603 A | 3/1990 | Pollner et al. |
| 4,911,604 A | 3/1990 | Pollner et al. |
| 4,913,253 A | 4/1990 | Bowling |
| 4,917,563 A | 4/1990 | Pollner et al. |
| 4,917,564 A | 4/1990 | Pollner et al. |
| 4,923,253 A | 5/1990 | Pollner et al. |
| 4,950,121 A | 8/1990 | Meyer et al. |
| 4,976,499 A | 12/1990 | Guichard et al. |
| 4,994,681 A | 2/1991 | Mann |
| 4,997,331 A | 3/1991 | Grinsted et al. |
| 5,013,205 A | 5/1991 | Schardt |
| 5,048,625 A | 9/1991 | Birkeholm |
| 5,051,052 A | 9/1991 | Franken et al. |
| 5,054,714 A | 10/1991 | Franken et al. |
| 5,078,340 A | 1/1992 | Anderberg |
| 5,082,082 A | 1/1992 | Hvolka |
| 5,110,067 A | 5/1992 | Sinkkonen |
| 5,151,003 A | 9/1992 | Zschoche |
| 5,176,341 A | 1/1993 | Ishikawa et al. |
| 5,202,075 A | 4/1993 | Barnard et al. |
| 5,219,033 A | 6/1993 | Pollner et al. |
| 5,259,572 A | 11/1993 | Franken et al. |
| 5,261,778 A | 11/1993 | Zschoche |
| 5,302,074 A | 4/1994 | Elfstrom |
| 5,302,075 A | 4/1994 | Zschoche |
| 5,302,076 A | 4/1994 | Bammel et al. |
| 5,308,212 A | 5/1994 | Pollner et al. |
| 5,314,287 A | 5/1994 | Wichert |
| 5,346,354 A | 9/1994 | Hellstrom |
| 5,381,987 A | 1/1995 | Carns |
| 5,480,274 A | 1/1996 | Franken et al. |
| 5,511,926 A | 4/1996 | Iles |
| 5,516,252 A | 5/1996 | Francke et al. |
| 5,549,436 A | 8/1996 | Fresia |
| 5,562,388 A | 10/1996 | Le Gall et al. |
| 5,655,733 A | 8/1997 | Roach |
| 5,680,125 A | 10/1997 | Elfstrom et al. |
| 5,860,785 A | 1/1999 | Eberspacher |
| 6,209,671 B1 | 4/2001 | Klein et al. |
| 6,283,696 B1 | 9/2001 | Trummer et al. |
| 6,301,529 B1 | 10/2001 | Itoyama et al. |
| 6,305,484 B1 | 10/2001 | Leblanc |
| 6,352,130 B2 | 3/2002 | Klein et al. |
| 6,352,318 B1 | 3/2002 | Hosomi et al. |
| 6,357,989 B1 | 3/2002 | Iles |
| 6,390,762 B1 | 5/2002 | Peery et al. |
| 6,405,975 B1 | 6/2002 | Sankrithi et al. |
| 6,543,790 B2 | 4/2003 | Johnson |
| 6,600,992 B2 | 7/2003 | Dow |
| 6,675,920 B1 | 1/2004 | Diez et al. |
| 6,739,822 B2 | 5/2004 | Johansson |
| 6,751,588 B1 | 6/2004 | Menendez-Pidal et al. |
| 6,923,281 B2 | 8/2005 | Chernoff et al. |
| 6,945,354 B2 | 9/2005 | Goff |
| 7,975,959 B2 | 7/2011 | Perry et al. |
| 8,181,725 B2 | 5/2012 | Andres et al. |
| 8,562,014 B2 | 10/2013 | Seidman et al. |
| 8,640,804 B2 | 2/2014 | Levy et al. |
| 2002/0173904 A1 | 11/2002 | Dow |
| 2003/0047362 A1 | 3/2003 | Chernoff et al. |
| 2003/0095854 A1 | 5/2003 | Abela |
| 2005/0196256 A1 | 9/2005 | Rodenkirch et al. |
| 2006/0056949 A1 | 3/2006 | Eckert |
| 2006/0278756 A1 | 12/2006 | Marshall |
| 2008/0083851 A1* | 4/2008 | Perry et al. .................. 244/189 |
| 2009/0183499 A1 | 7/2009 | Boorse |
| 2011/0127366 A1 | 6/2011 | Becker |
| 2011/0224845 A1 | 9/2011 | Perry et al. |
| 2012/0061521 A1 | 3/2012 | Perry et al. |
| 2012/0119018 A1 | 5/2012 | Perry et al. |

FOREIGN PATENT DOCUMENTS

| | | |
|---|---|---|
| DE | 3327628 | 2/1985 |
| DE | 3327629 | 2/1985 |
| DE | 3521429 | 12/1986 |
| DE | 3534045 | 4/1987 |
| DE | 3928854 | 3/1991 |
| DE | 4007610 | 9/1991 |
| DE | 4009419 | 9/1991 |
| DE | 4102861 | 8/1992 |
| DE | 4131649 | 3/1993 |
| DE | 4324211 | 1/1995 |
| DE | 4340919 | 3/1995 |
| DE | 4446047 | 7/1996 |
| DE | 4446048 | 7/1996 |
| DE | 3844744 | 5/1997 |
| DE | 19734238 | 2/1998 |
| EP | 235845 | 9/1987 |
| EP | 649787 | 4/1995 |
| EP | 1190947 | 3/2002 |
| EP | 1574430 | 9/2005 |
| EP | 1623924 | 2/2006 |
| EP | 1634808 | 3/2006 |
| FR | 2581965 | 11/1986 |
| FR | 2675919 | 10/1992 |
| FR | 2911658 | 7/2008 |
| GB | 1249465 | 10/1971 |
| JP | 56002237 | 1/1981 |
| JP | 57070741 | 5/1982 |
| JP | 2279497 | 11/1990 |
| JP | 4138997 | 5/1992 |
| JP | 2001-505512 | 4/2001 |
| JP | 2003189412 | 7/2003 |
| RU | 2271316 | 3/2006 |
| RU | 2302980 | 7/2007 |
| WO | 85/00790 | 2/1985 |
| WO | 89/03343 | 4/1989 |
| WO | 90/11932 | 10/1990 |
| WO | 93/13985 | 7/1993 |
| WO | WO 98/25822 | 6/1998 |
| WO | 98/52822 | 11/1998 |
| WO | 2004/028903 | 4/2004 |
| WO | 2004/114252 | 12/2004 |
| WO | 2008/038270 | 4/2008 |
| WO | WO/2008/139437 | 11/2008 |
| WO | WO/2008/139440 | 11/2008 |
| WO | 2010/012261 | 2/2010 |
| WO | 2010/061384 | 6/2010 |
| WO | 2011/101782 | 8/2011 |

OTHER PUBLICATIONS

International Search Report for PCT/IL2007/001172 dated May 14, 2008.

International Search Report for PCT/IL2008/000036 dated Oct. 14, 2008.

International Search Report for PCT/IL2008/00459 dated Nov. 6, 2008.

International Search Report for PCT/IL2009/001110 dated Oct. 26, 2010.

International Search Report from International Application No. PCT/IB2011/050626 mailed Jul. 1, 2011.

(56) References Cited

OTHER PUBLICATIONS

U.S. Appl. No. 13/796,989, filed Mar. 12, 2013, Perry et al.
U.S. Appl. No. 14/325,513, filed Jul. 8, 2014, Decoux et al.
U.S. Appl. No. 14/335,220, filed Jul. 18, 2014, Braier et al.

* cited by examiner

PLANE TRACTOR

The present invention relates to an airplane tractor used in airports to tow airplanes, and more specifically relates to an airplane tractor comprising a gripping device, a gripping method for gripping the nose gear of the airplane using such a tractor, and a method for pulling an airplane.

Tractors are currently used that are equipped with gripping devices making it possible to lift the nose gear of the airplane, so as to tow it, the gear being, as we know, made up of a pair of wheels each comprising one tire, the pair of wheels being fixed to the end of a leg pointing downward from the nose of the aircraft.

One known gripping system for a tractor comprises a hinged longitudinal arm that extends at the inlet of the gripping system, and that is intended to be placed at the rear of the nose gear of the airplane. This longitudinal arm closes on the wheels so as to tighten the nose gear. Opposite the longitudinal arm, a strip in the shape of a shovel is transversely fixed to the tractor slightly above the ground, and is capable of pivoting under the action of a cylinder. The strip therefore makes it possible to lift the front wheels of the airplane, immobilized against the walls of the longitudinal arm and the shovel-shaped strip. Such a device is used on a tractor of the tow barless type: for example, a TPX model tractor of the TLD Brand™.

Similar devices exist. For example, systems are known where the hinged longitudinal arm can be replaced by hinged gates that are intended to be placed on both sides of the nose gear of the airplane. Document WO/2008/139437 presents one such system.

Today, tractors are used equipped with such devices to perform airplane driving operations. Two types of driving operations are commonly performed. There is first the so-called "push-back" type, which consists of moving airplanes loaded with passengers (or freight) and fuel away from the jet bridges and other stationary facilities so as to put them in the independent driving position. There is also a so-called "maintenance towing" operation, which consists of moving an empty airplane toward a hangar where maintenance and upkeep operations are performed on the airplane.

In all other cases where the airplane performs a driving operation, the airplane is in the independent driving position; it moves using its own means, i.e. owing to the thrust of its reactors. In particular, the airplane is in the independent driving position during the "taxiing out" phase and/or the return phase. The driving of the airplane in that case is the responsibility of the pilot, who adjusts the airplane's speed only by using the primary brakes of the airplane, the thrust provided by the reactors remaining constant. During this phase when the airplane is driving toward the takeoff runway, the speed of the airplane is approximately 20 knots, i.e. a speed of approximately 37 km/h. The average waiting time of an airplane before it can take off is 20 min., but this period may sometimes exceed 1 hour. And throughout that entire waiting time, the reactors continue to run and consume fuel.

It has been considered to substitute the use of the reactors with a tractor during this so-called "taxiing out" phase. The operation is then referred to as "dispatch towing." Tests have been performed in this sense, and it has been possible to observe that the fuel consumption of the tractor is considerably lower than what the reactors of the airplanes would have consumed if they had been used.

Despite these fuel savings, the tests have been deemed unacceptable for the following reasons. First, the existing tractors are too slow. Airports are overloaded, and slowing down the routing of the airplanes toward the takeoff runways is inconceivable. Also, the current gripping devices are not adapted to an operational context where it is important for problems to be able to be resolved quickly. In particular, the current mechanisms do not make it possible to unload the airplane quickly in the event the tractor breaks down, which causes a slowdown or even blockage of other airplanes. Any delay is extremely costly for the airlines. Also, the loads and fatigues caused on the nose gear of the airplane are too high during the "dispatch towing" phase. The lifetime of the landing nose gear is thus greatly reduced. For this reason, airplane builders have limited the number of maneuvers that can be performed in this way, some going so far as to prohibit tractors from performing this dispatch towing operation. The airlines have consequently renounced the use of tractors for the taxiing phase. In addition to these economic and technical considerations, there are also legal considerations. Liability is currently transferred to the pilot once the reactors are turned on, and the driver of the tractor is then released from all liability. The liability of driving an airplane on the takeoff runway would then fall to the driver of the tractor, which is inconceivable for airlines and airport managers.

Document WO/2008/139440 presents an airplane tractor making it possible to perform the taxiing phase by allowing the pilot to check the direction and speed of the tractor. However, this airplane tractor comprises a complex gripping system; many actuators are necessary to install the nose gear of the airplane on the tractor. The loading/unloading steps of the airplane are therefore too long and complex. Furthermore, the large number of actuators makes it difficult and excessively time-consuming to unload the airplane in the event the tractor breaks down.

The invention aims to avoid these drawbacks by proposing an airplane tractor comprising a gripping device making it possible to improve the loading and unloading of the airplane on the tractor, and in particular a gripping device adapted to pull an airplane toward a takeoff runway.

To that end, an airplane tractor is proposed having a gripping system for gripping the nose gear of the airplane, comprising:
  a chassis;
  wheel modules connected to the chassis, each wheel module including at least one actuator for inducing a vertical movement of the module in relation to the chassis;
  a gripping platform of the nose gear of an airplane, the platform together with the chassis having freedom of movement substantially in circular translation; and
  an actuating means connecting the platform and the chassis, said actuating means also constituting a damping means for damping the free movement of the platform in relation to the chassis.

The tractor according to the invention can also comprise at least one of the following features:
  at least one gate intended to oppose the force exerted on at least one wheel of the nose gear of the airplane by the gripping platform;
  the gripping platform comprises a locking device for locking at least one wheel of the nose gear of the airplane;
  the locking device of said at least one wheel of the nose gear is installed on a turret positioned on the gripping platform, the turret rotating freely around a substantially vertical axis in relation to the gripping platform;
  the locking device for said at least one wheel comprises:
    a wheel abutment for the nose gear of the airplane;
    a tightening device to maintain the wheel of the nose gear of the airplane against the abutment;
  the tightening device comprises a tightening plate connected to a triangle actuated by a cylinder;

the tightening plate is retractable in the absence of an airplane wheel on the platform;

the abutment has an adjustable location;

the actuator of each wheel module is a hydraulic cylinder;

the cylinder of the tightening device is a hydraulic cylinder;

the damping and actuating means constitutes a sensor of the relative movement between the platform and the chassis;

the platform has a base connected to the chassis by vertical tie rods;

an actuator for inducing an incline of the base of the platform in relation to a horizontal plane;

the vertical tie rods have adjustable lengths and/or adjustable fastening points to the chassis;

each wheel module has a respective angle of rotation in relation to a longitudinal axis of the tractor and around an axis of rotation substantially vertical to the chassis of the tractor;

the turret comprises at least one sensor measuring an angular displacement of the turret in relation to the gripping platform, and each respective angle of rotation is determined as a function of the measured angular displacement of the turret.

Also proposed is a method for gripping the nose gear of an airplane using an airplane tractor comprising:

a chassis;

wheel modules connected to the chassis, each wheel module including at least one actuator for inducing a vertical movement of the module in relation to the chassis;

a gripping platform for gripping the nose gear of an airplane, the platform being moveable substantially in circular translation in relation to the chassis, the platform going from a retracted position to a gripping position by way of an equilibrium position;

a damping and actuating means connecting the platform and the chassis.

The method comprises the following steps:

actuating the damping and actuating means to place the gripping platform in the retracted position;

lowering the chassis;

moving the tractor so as to place the retracted gripping platform in contact with at least one wheel of the nose gear of the airplane;

actuating the damping and actuating means to move the gripping platform from its retracted position toward its gripping position while adjusting the height of the chassis by controlling the actuators of at least two wheel modules so as to slide the gripping platform under the wheel;

raising the chassis;

bringing the platform back to its equilibrium position.

The gripping method for gripping the nose gear of an airplane using an airplane tractor can also include at least one of the following features:

a step consisting of closing a gate of the tractor when the gripping platform is in contact with said at least one wheel of the nose gear of the airplane;

a step consisting of opening the gate of the tractor when the chassis raises;

when the gripping platform has been slid under the wheel, a step consisting of moving the tractor to bring said at least one wheel onto a locking device;

steps consisting of:
    setting the location of an abutment as a function of the type of airplane and/or the type of wheel;
    bringing said at least one wheel onto the locking device against the abutment;
    bringing a tightening plate against the wheel to maintain it against the abutment;

a step consisting of inclining the platform in relation to a horizontal plane.

Also proposed is a method for pulling an airplane comprising the following steps:

loading the airplane on a tractor according to the gripping method for gripping the nose gear of an airplane using an airplane tractor;

making the tractor travel at a constant speed;

regulating the speed of the tractor as a function of the force measured by the damping and actuating means.

The method for pulling a airplane can also comprise at least one of the following features:

the speed of the tractor is checked when the measured force exceeds a dynamically determined threshold level;

the platform of the tractor comprises a turret receiving said at least one wheel of the nose gear of the airplane, the turret freely rotating around a substantially vertical axis in relation to the gripping platform, the direction of the tractor being modified as a function of the rotation of the turret in relation to the gripping platform;

the rotation of the turret is induced by a rotational movement of the nose gear;

the tractor comprising wheel modules connected to the chassis, each wheel module being able to perform a rotation along an axis of rotation substantially vertical to the chassis of the tractor, in which each wheel module has its own rotation and the longitudinal axis of the airplane is merged with the longitudinal axis of the tractor.

Figure 2:
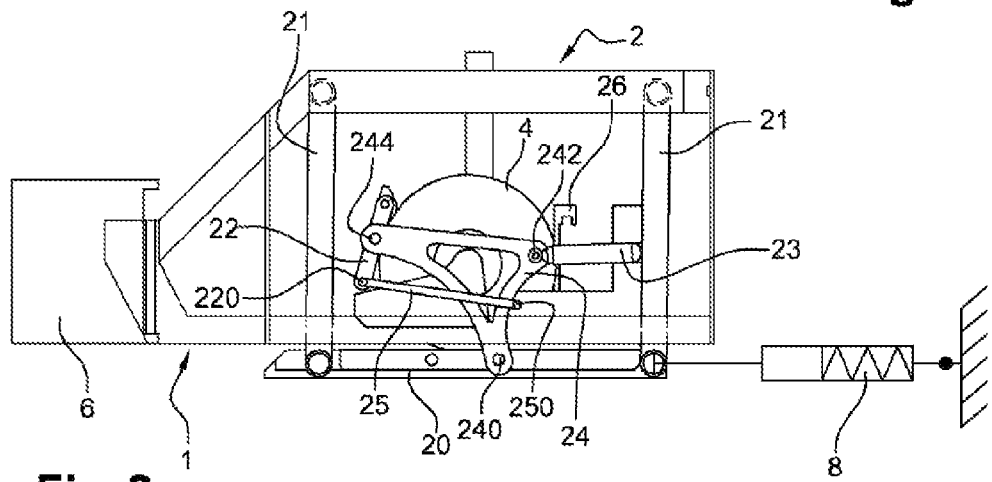
Figure 3:
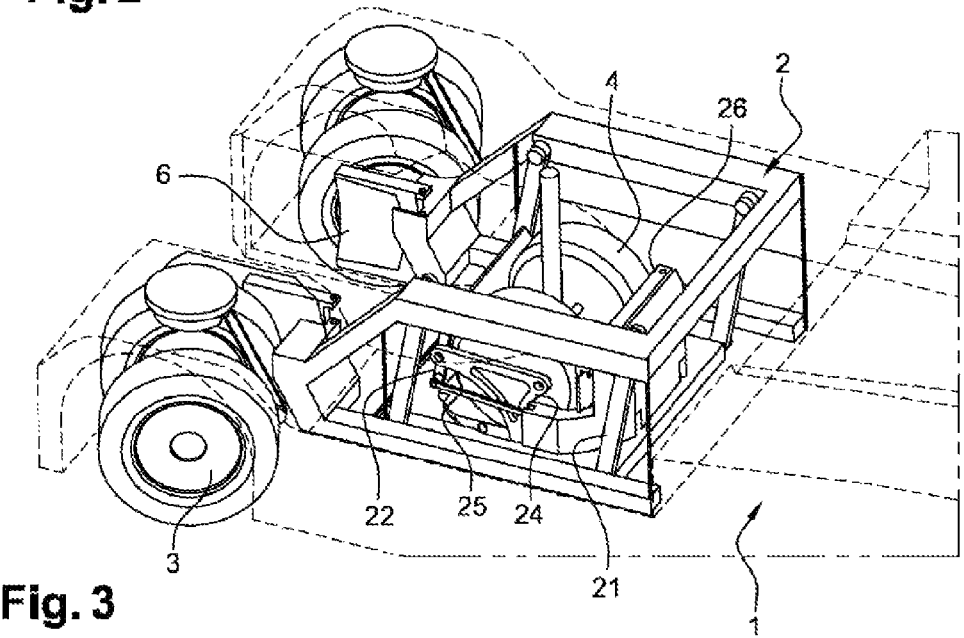
Figure 4:
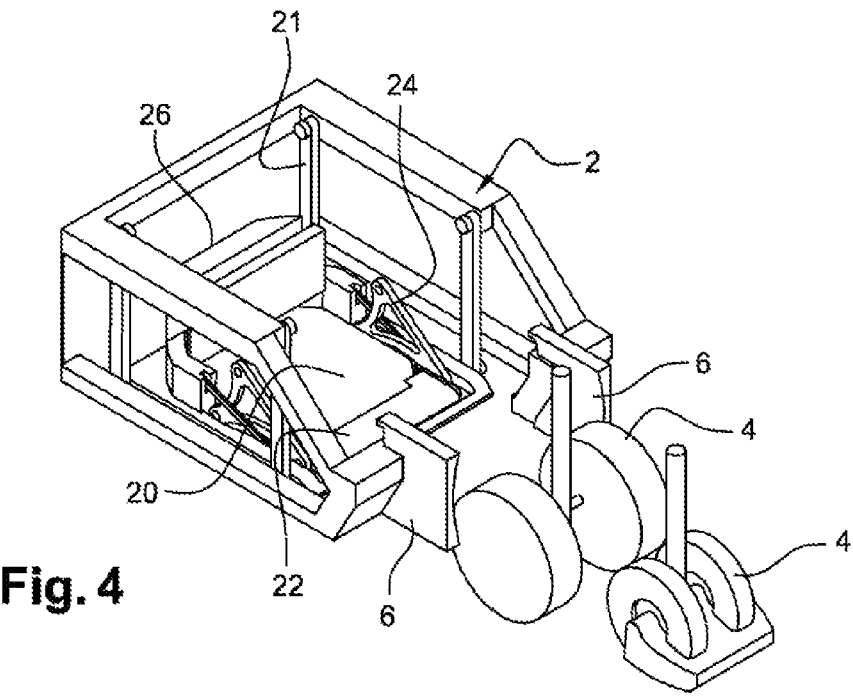
Figure 5:
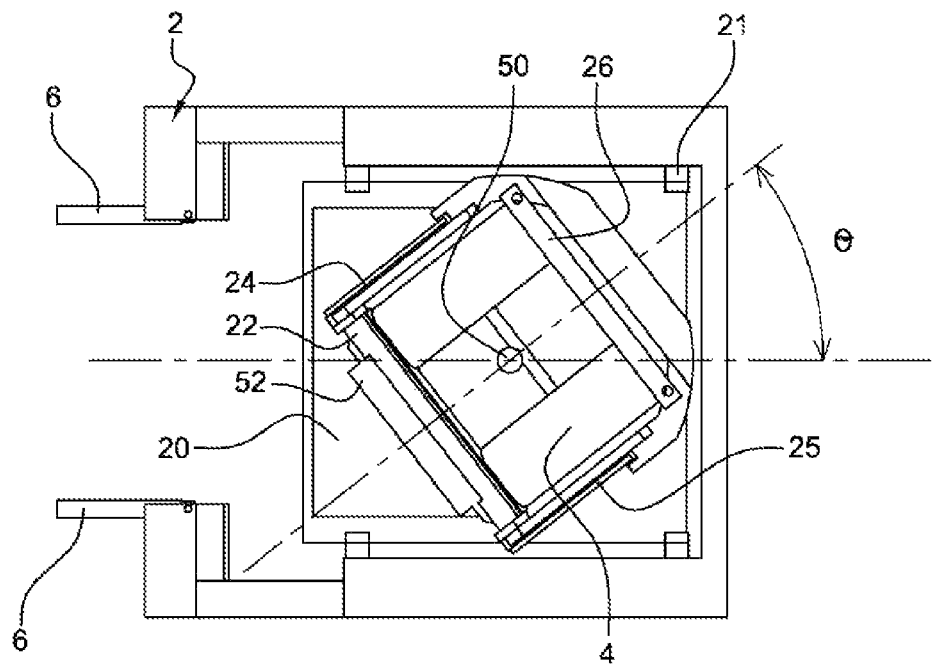
Figure 24:
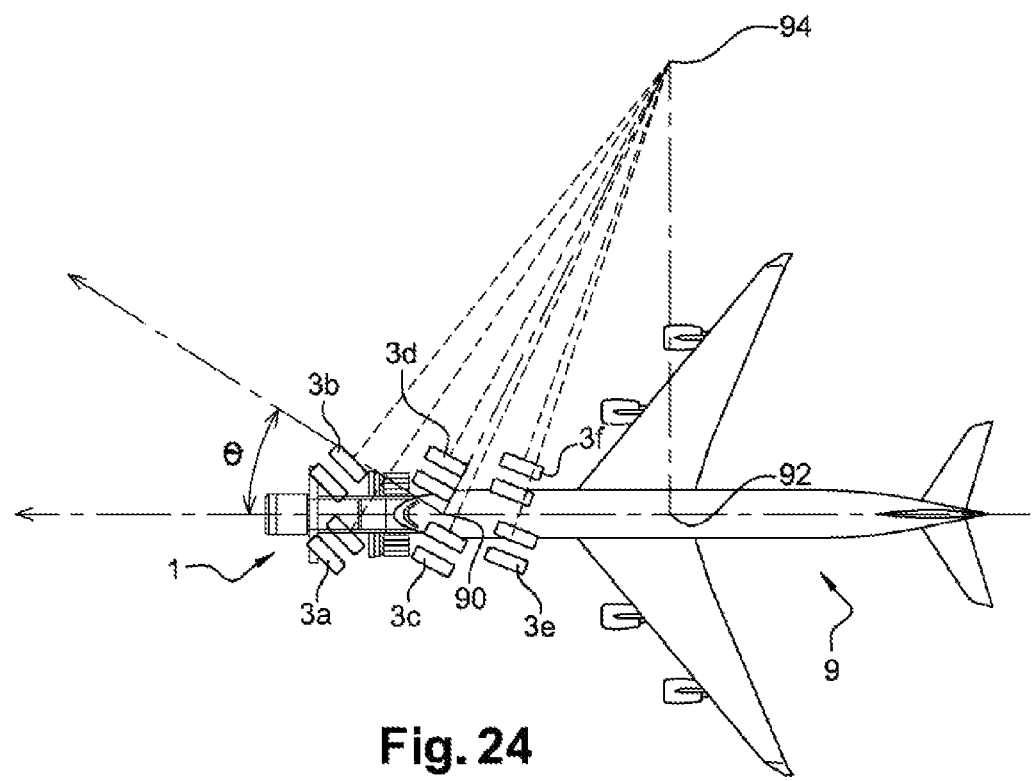
Figure 25:
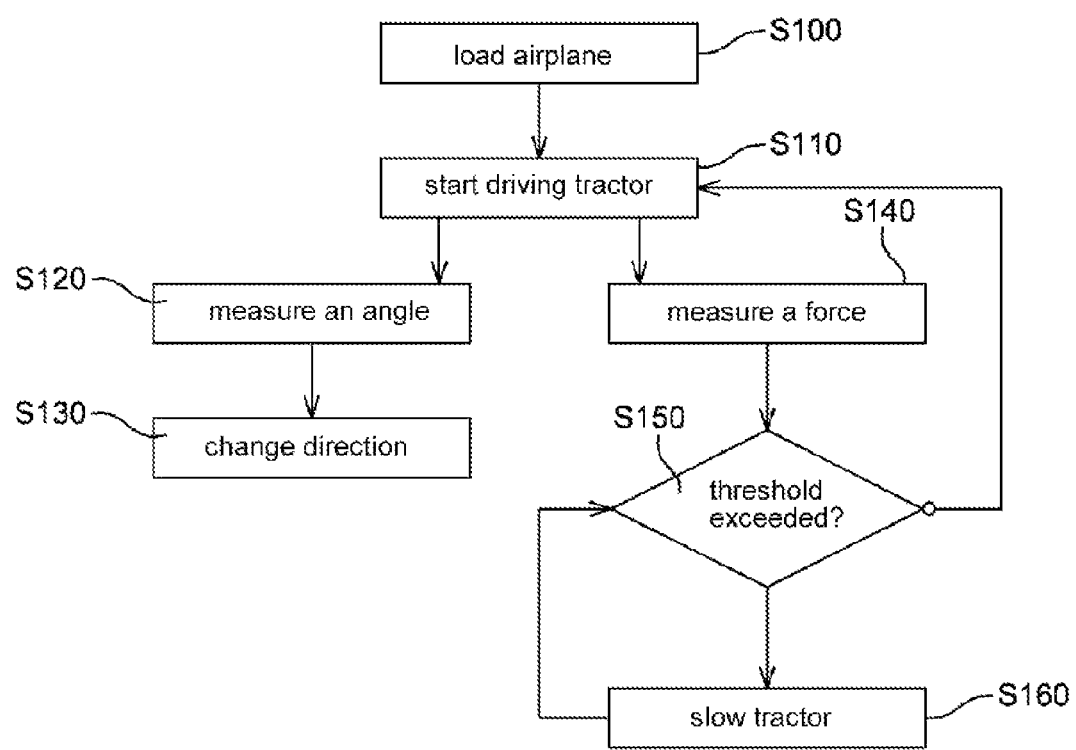

Other features and advantages of the invention will appear upon reading the following detailed description of embodiments of the invention, provided solely as an example and in reference to the drawings, which show:

FIG. 1, a diagrammatic side view of an airplane tractor according to the invention;

FIG. 2, a diagrammatic side view of a gripping system according to the invention;

FIG. 3, a diagrammatic perspective view of the back of an airplane tractor according to the invention;

FIG. 4, a diagrammatic perspective view of the gripping system according to the invention;

FIG. 5, a diagrammatic top view of the gripping system according to the invention;

FIG. 6-23, steps of a gripping method for gripping the nose gear of an airplane according to the invention;

FIG. 24, a diagrammatic view of an airplane tractor pulling an airplane according to the invention;

FIG. 25, a flowchart of a method for pulling an airplane.

Proposed is an airplane tractor having a gripping system for gripping the nose gear of the airplane. The tractor comprises a chassis, as well as wheel modules connected with the chassis. Each wheel module comprises at least one actuator for inducing a vertical movement of the module in relation to the chassis. In this way, it is possible to raise or lower the chassis in relation to a driving plane. The tractor also comprises a gripping platform for gripping the nose gear of the airplane which, together with the chassis, has a freedom (substantially in circular translation, i.e. all points of the platform have trajectories that are circles with the same radius, but different centers). In this way, owing to this substantially circular translational freedom of the platform in relation to the chassis, the platform preserves a substantially constant angle in relation to the chassis of the tractor. In this way, the gripping platform can move following a pendular movement in relation to the chassis of the tractor. In other words, the platform can remain substantially parallel with a horizontal plane of the tractor or can be inclined in relation to the horizontal and preserve substantially the same incline during its movement in relation to the tractor. The tractor also comprises a damping and actuating means connecting the platform and the chassis. Notably, the actuating means constitutes a damping means of the free movement in circular translation of the gripping platform in relation to the chassis. This damping and actuating means advantageously makes it possible to modify the position of the platform in relation to the chassis, but also to capture a relative movement of that same platform in relation to the chassis.

FIG. 1 is a diagram of a side view of an airplane tractor according to the invention. The airplane tractor 1 comprises a chassis 5 that is connected with four wheel modules 3. Only the two wheel modules situated on one side of the vehicle are visible in the figure.

The wheel modules can perform a rotation in either direction along a substantially vertical axis of rotation of the chassis of the tractor.

Each wheel module comprises at least one actuator for inducing a vertical movement of the module in relation to the chassis. In practice, the actuator is a cylinder, for example a hydraulic cylinder, positioned on both sides of two arms hinged in relation to one another that provide the connection of the wheel module to the chassis. The hinged arm, actuator, and wheel assembly forms a wheel module. The actuator provides the force necessary to subtly set the angle formed between the two hinged arms. The vertical movement of each wheel module in relation to the chassis can occur independently in relation to the other wheel modules.

The number of wheel modules comprised by a tractor can vary. Preferably, the number of wheel modules is even; for example, the airplane tractor can have 4 or 6 wheel modules. Furthermore, each wheel module can comprise one or more wheels. For example, each of the wheel modules 3 shown in FIG. 3 comprises two wheels.

The airplane tractor 1 shown in FIG. 1 also comprises a gripping system 2 for gripping the nose gear of an airplane 4 that is detailed in FIG. 2.

FIG. 2 shows a gripping system according to one embodiment of the invention. The gripping system for gripping the nose gear 4 of an airplane comprises a gripping platform 20 which, together with the chassis, has freedom substantially in circular translation, i.e. all points of the platform have trajectories that are circles with the same radius but different centers. Thus, due to the substantially circular translational freedom of the platform in relation to the chassis, the platform preserves a substantially constant angle with a horizontal plane formed by the chassis of the tractor.

In practice, the gripping platform 20 is connected to the chassis 1 of the tractor using vertical tie rods 21 connected to the chassis. The tie rods are respectively fixed to the platform and the chassis according to a ball link such that the platform has a substantially circular translational freedom with the chassis. Four vertical tie rods are for example illustrated in FIG. 3. The number of tie rods can be higher or lower; for example, 6 tie rods. Preferably, the number of tie rods is even. In the figures, the vertical tie rods have substantially the same length, and their binding point to the chassis situated at the same height, which ensures that the gripping plane and the chassis are substantially parallel.

According to one embodiment, the base of the gripping platform 20 can be inclined in relation to a horizontal plane, for example when tractor is used for an airplane having a nose gear with an inclined leg in relation to a vertical axis—for example, the case of the Airbus A320. The gripping platform 20 can be inclined by acting on the vertical tie rods 21. For example, the length of the tie rods can be adjusted so as to raise or lower the front or back of the platform 20 and thereby give it the necessary angle with the horizontal plane. To that end, at least some of the vertical tie rods 21 can be made up of ball screws or hydraulic cylinders, or associated with a rack. Rather than adjusting the length of the vertical tie rods, it is also possible to consider adjusting the height of the fastening point thereof to the chassis 5 of the tractor so as to create the incline angle, for example by fixing one end of the tie rods to a cam or a cylinder. A combination of these two embodiments can also be considered.

FIG. 2 also shows a damping and actuating means 8 connecting the platform and the chassis. This damping and actuating means 8 advantageously makes it possible to check the relative position of the platform in relation to the chassis during the loading and unloading operations of the airplane. In particular, the damping and actuating means 8 makes it possible to check and control the translation of the gripping platform position, such that it is possible to cause the platform 20 to slide under the wheels of the nose gear of the airplane during a loading operation. Conversely, during an unloading operation, it is possible to cause the withdrawal of the platform 20 so as to release the wheels of the nose gear of the airplane from the platform. Furthermore, the damping and actuating means 8 makes it possible to damp any relative movement of the airplane in relation to the tractor, when the airplane is loaded on the tractor, and more precisely on the gripping platform 20 of the tractor. Notably, the damping and actuating means 8 makes it possible to damp the free circular translational movement of the gripping platform 20 with the chassis of the tractor; in other words, the free pendular movement of the gripping platform is damped by the damping and actuating means 8.

The damping of this relative movement offers the advantage of limiting the forces on the nose gear of the airplane, and more particularly when a deceleration of the convoy made up of the airplane and the tractor pulling the airplane occurs, following a braking force caused by the airplane. The decelerations are then transmitted from the airplane to the tractor through the nose gear of the airplane, which is attached to the gripping platform. The damping and actuating means 8 makes it possible to damp the forces on the nose gear of the airplane, and thereby to increase the average driving speed of the tractor when it pulls an airplane. In this way, the damping and actuating means 8 contributes to improving and accelerating the transport of the airplane toward its takeoff runway, while limiting the forces on the nose gear of the airplane and premature fatigue of the nose gear.

In practice, the damping and actuating means 8 can be a hydraulic cylinder.

FIG. 2 also shows that the tractor comprises at least one gate 6 intended to oppose a force exerted on at least one wheel of the nose gear of the airplane by the gripping platform. In fact, during the operation of loading the nose gear of the airplane on the platform, the platform 20 is slid under the wheels of the airplane. And despite the fact that the wheels can rotate freely, the friction caused by the sliding of the gripping platform under the wheels is significant, and a significant force is exerted on the nose gear of the airplane. Thus, under the effect of the movement of the gripping platform and its contact with the wheels of the nose gear, the latter is pushed in a direction similar to the direction of displacement of the platform, which induces forces that can lead to early fatigue of the nose gear of the airplane. In order to limit these effects on the nose gear, the gates 6, hinged around a vertical axis of rotation, close behind the wheels of the nose gear so as to constitute an abutment making it possible to oppose the displacement thereof. The wheels are therefore in contact on one side with the gates 6, and on the other side in contact with the platform 20 that slides under them.

The gripping platform 20 can also have a locking device for locking at least one wheel of the nose gear of the airplane. Such a device aims to prevent any unhooking of the nose gear of the airplane loaded on the tractor and to transmit the pulling forces. The locking device of said wheel notably comprises a wheel abutment 26 of the nose gear of the airplane and a tightening device (22, 23, 24) to maintain the wheel of the nose gear of the airplane against the abutment.

The locking device for locking said wheel of the nose gear can be installed on a turret positioned on the gripping platform. The turret can be freely rotating in relation to the gripping platform around an axis of rotation substantially perpendicular to the gripping platform and substantially vertical. FIG. 5 shows the locking device, which is positioned on a turret 52 that is freely rotating around an axis of rotation 50 substantially vertical to the platform 20.

The wheel abutment 26 of the nose gear of the airplane is intended to stop the progression of the wheel of the nose gear of the airplane when the gripping platform is slid under the wheel. The abutment can assume various forms. It can for example assume the general form of a plate wide enough to be in contact with both of the wheels of the nose gear 4, as shown in FIG. 3. Other forms can also be considered: the abutment 26 can be in the general form of a shovel, thereby increasing the contact surface with the wheel of the nose gear of the airplane.

The abutment has an adaptable location so that its positioning can be adapted depending on the type of airplane and/or the type of wheel. In fact, the diameter of the wheels of the nose gear of an airplane can vary from one airplane model to the next, so that the contact zone of the wheel on the gripping platform varies according to the diameter of the wheel and the location of the abutment. Advantageously, the location of the abutment can be adapted so as to place it correctly on the locking device for locking the wheel of the nose gear of the airplane. Furthermore, correctly adapting the location of the abutment makes it possible to adjust the coincidence between the axis of rotation of the wheel of the nose gear of the airplane and the axis of rotation of the turret. This noticeably improves the transmission of the rotation from the nose gear to the turret.

The tightening device maintains the wheel 4 of the nose gear of the airplane against the abutment, as shown in FIG. 2. This maintaining is ensured by a tightening plate 22 connected to a triangle 24 actuated by a cylinder 23. In practice, the tightening device comprises two triangles, two cylinders, which are positioned on both sides of the tightening plate 22. In the continuation of the description, only one side of the tightening device is described.

The tightening plate 22, when it is actuated by the cylinder 23, comes into contact against the wheel of the nose gear of the airplane, which in turn is in contact with the abutment 26. The cylinder 23 connects the elements positioned on the platform without any connection with the chassis. The tightening plate 22 then tightens the wheel by applying a force primarily oriented toward the abutment. This force applied by the tightening plate 22 can also be substantially oriented toward the platform.

The tightening device can comprise, aside from the tightening plate 22 connected to the triangle 24 actuated by the cylinder 23, a connecting rod 25. In practice, the device comprises two connecting rods; one for each cylinder/triangle pair.

The assembly of these elements 22, 23, 24, 25 is arranged as shown in FIG. 2. A first apex 240 of the triangle 24 is connected to the platform by a pivot link. When the locking device is installed on a turret, the triangle 24 can be connected to the turret so as not to hinder the rotation thereof. The cylinder 23 is connected to a second apex 242 of the triangle 24 by a ball link. The third apex 244 of the triangle 24 is connected to the tightening plate 22 by a pivot link. Preferably, the pivot link between the third apex 244 and the tightening plate 22 is in a median position on one side of the plate 22, while the connecting rod 25 is connected to one of the ends 220 of the side of the plate 22 on the one hand, and the platform on the other hand. When the cylinder 23 retracts, the triangle 24 pivots around its first apex 240, so that the third apex of the triangle 24 rises, carrying away the plate 22 with it. At the same time, the connecting rod 25 acts on the end 220 of the tightening plate 22, which causes a rotation of the tightening plate 22. This rotation makes it possible to go from a substantially horizontal position of the tightening plate to an at least vertical position in which the largest surface of the plate 22 is in contact with the wheel of the nose gear of the airplane. Advantageously, the tightening plate comes into contact with the wheels 4 irrespective of the diameter of the wheel of the loaded airplane.

The tightening plate 22 can be retractable into the platform owing to the rotation of the tightening plate 22 carried away by the connecting rod 25. The tightening plate 22 is then placed in a housing provided in the platform to that end. Alternatively, the tightening plate 22 can constitute an access ramp to the platform. The tightening plate 22 is then long enough to come into contact with the ground when it is pivoted by the connecting rod 25. In other words, the tightening plate 22 is adapted to pivot from a high position in which the tightening plate is in contact with the wheels 4 to a low position in which one end of the tightening plate is in contact with the ground. In another alternative, the tightening plate 22 can both be retractable and constitute an access ramp to the platform. The tightening plate, whether it is retractable and/or constitutes an access ramp, offers the advantage of facilitating the rolling of the wheel 4 toward the abutment 26, since the tightening plate does not constitute an obstacle that must be overcome by the wheel.

In practice, the cylinder 23, which actuates the tightening device, is a hydraulic cylinder. In fact, using a hydraulic cylinder has the advantage of making it possible to release the airplane quickly when the tractor breaks down. In particular, the tightening device can easily go from a tightening position (i.e. the tightening plate is exerting a coercive force against the wheel of the airplane) to a loosened position. To that end, it suffices to empty the cylinder, which expands, as a result of which the tightening plate retracts into the platform, which makes it possible to disengage the wheel of the nose gear of the airplane easily.

FIGS. 3 and 4 respectively show the locking device according to an embodiment of the invention and the tightening and loosened positions. FIG. 4 in particular shows the tightening plate 22, which is retracted into the platform 20.

FIG. 5 shows the locking device identical to that of FIGS. 3 and 4, but this time installed on a turret 52 positioned on the gripping platform 20.

FIGS. 6-23 show the successive steps of a method for gripping the nose gear of an airplane according to one embodiment of the invention.

Figure 6:
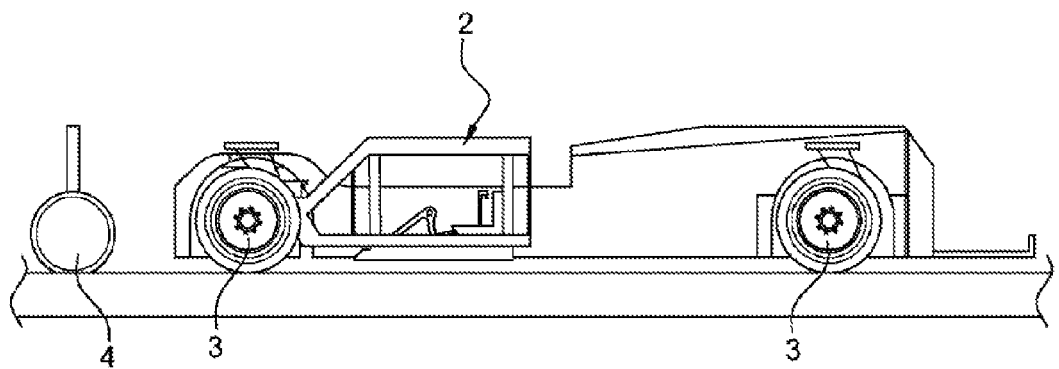
Figure 7:
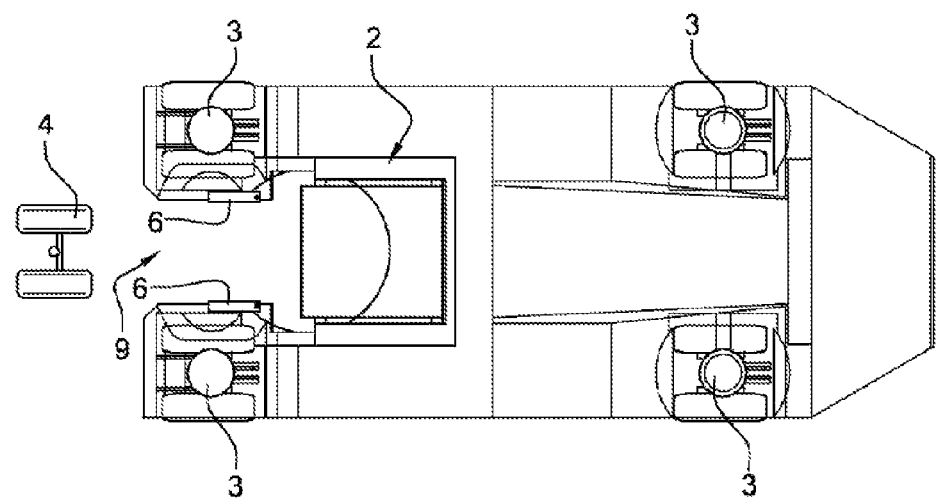

FIG. 6 shows an initial configuration, and FIG. 7 shows a top view of FIG. 6. The airplane is parked and its engines are off. Its primary brakes are blocked, i.e. the brakes of its rear end are applied, while the wheels of the nose gear are free.

The tractor is near the airplane. The gripping platform of the tractor is in an equilibrium position. The equilibrium position of the gripping platform corresponds to the lowest position thereof in relation to the chassis. In practice, the damping and actuating means 8 that connects the gripping platform and the chassis does not exert any force on the platform. FIG. 7 in particular shows that the gates 6, positioned on both sides of the opening 9 allowing the passage of the nose gear of the airplane, are in the open position. In this initial configuration, the abutment 26 is positioned according to the type of airplane and/or the type of tire that tractor will have to load. Alternatively, the positioning of the abutment 26 can be done in the step shown in FIGS. 14 and 16.

Figure 8:
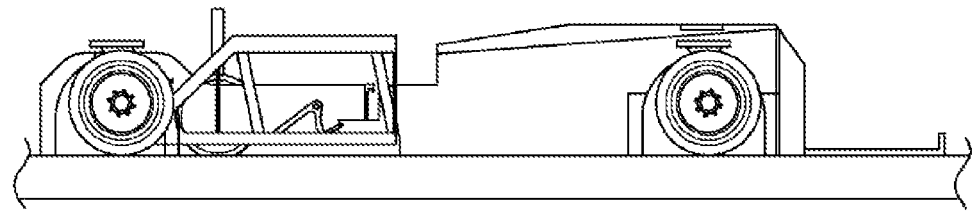
Figure 9:
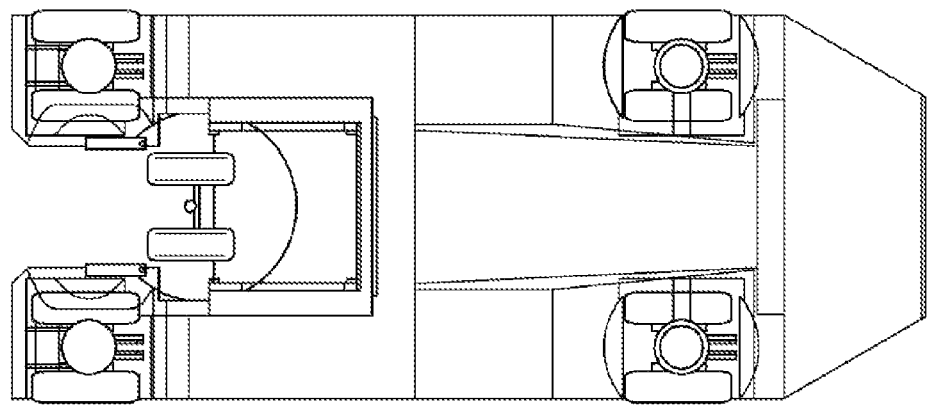

Then, the gripping platform of the tractor goes from an equilibrium position to a retracted position. The gripping platform goes into the retracted position following the actuation of the damping and actuating means that connect the gripping platform and the chassis. The retracted position is the position in which the gripping platform is found after having been translated in the direction opposite the opening 9 allowing the passage of the nose gear of the airplane. Once the gripping platform has reached its retracted position, or simultaneously, the chassis of the tractor lowers in response to the actuation of the actuators of each of the wheel modules. In FIG. 8, all of the wheel modules have contributed to lowering the chassis, but it is also possible to consider lowering only the back of the tractor. The lowering of the chassis is stopped when the gripping platform reaches a predetermined distance from the ground, potentially as far as in contact with the ground. The tractor is then driven so that the gripping platform comes into contact with the wheels of the nose gear of the airplane, as shown in FIG. 9, which corresponds to a top view of FIG. 8.

Figure 10:
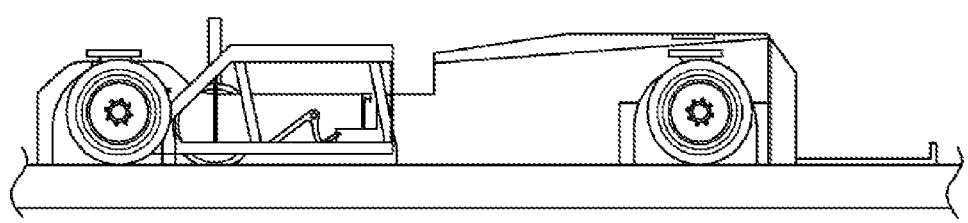
Figure 11:
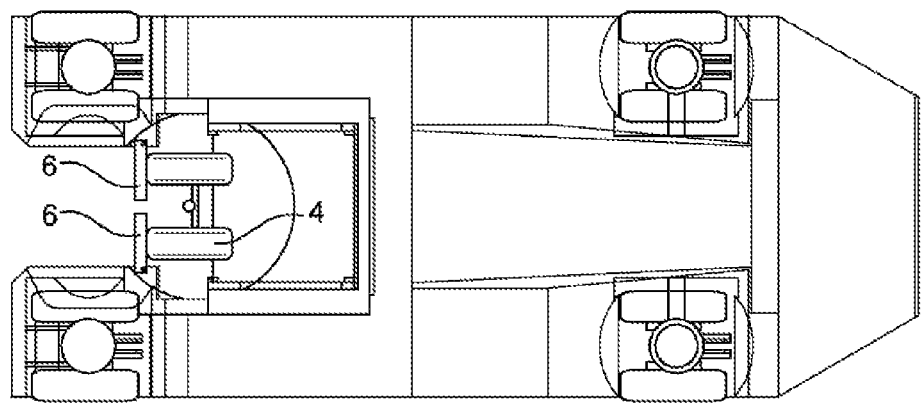

The next step is shown in FIGS. 10 and 11, FIG. 11 being a top view of FIG. 10. This step consists of closing the gates 6 so that they are placed on both sides of the nose gear of the airplane, opposite the platform.

Figure 12:
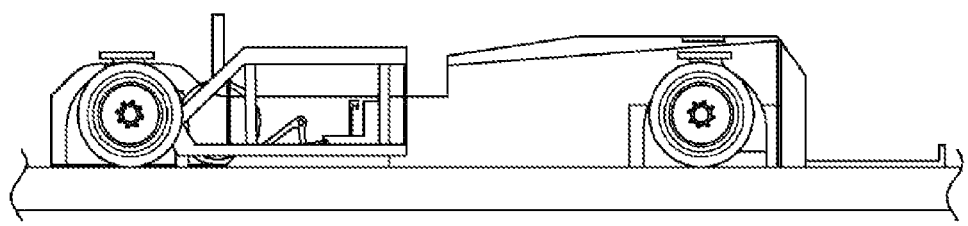
Figure 13:
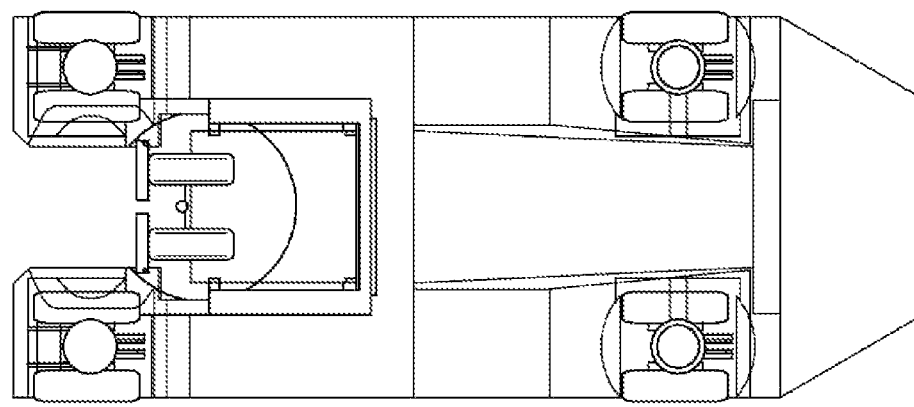

The following step is illustrated in FIGS. 12 and 13, FIG. 13 being a top view of FIG. 12. The damping and actuating means that connect the gripping platform and the chassis is actuated so as to move the platform toward a gripping position. The gripping position is the position in which the gripping platform is found after having been translated toward the opening allowing the passage of the nose gear of the airplane. During the movement of the gripping platform from its retracted position toward its gripping position, the height of the chassis is adjusted by at least two wheel modules so as to allow the transition from one position to the other. In fact, the gripping platform can be translated substantially circularly in relation to the chassis, meaning that it passes through its equilibrium position, which is its lowest position. In FIG. 12, all of the wheel modules participate in adjusting the height of the chassis. During that step, the gripping platform slides under the wheels of the nose gear of the airplane. The gates having been closed in the previous step, the wheels of the nose gear are in contact on one side with the gates, and on the other side in contact with the platform, which slides under them, the tires rolling on the platform. In order to limit the friction of the wheels against the gates, the latter can comprise rollers positioned horizontally and freely rotating.

Figure 14:
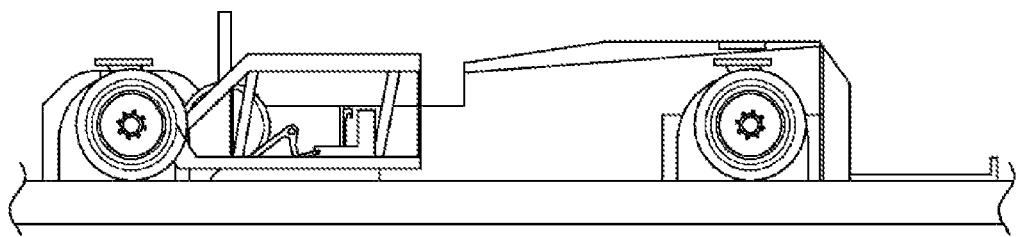
Figure 15:
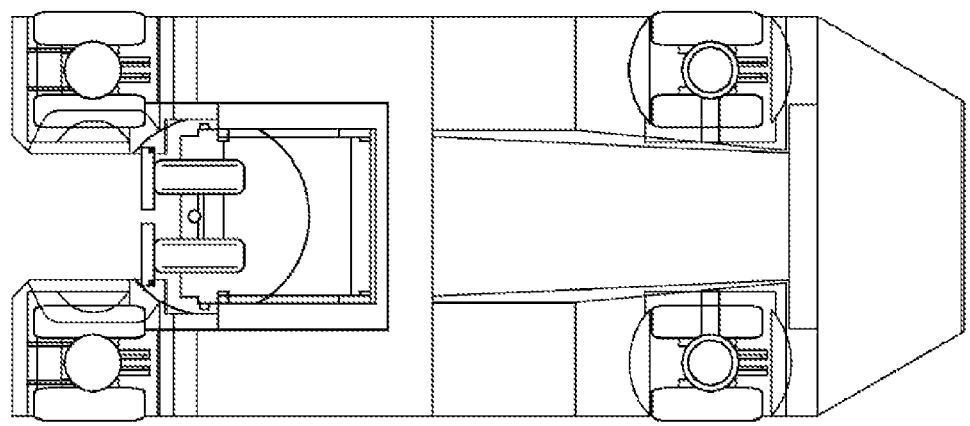

FIGS. 14 and 15 show that the wheels of the airplane have started to raise the gripping platform during the displacement of the platform from the retracted position to the gripping position.

Figure 16:
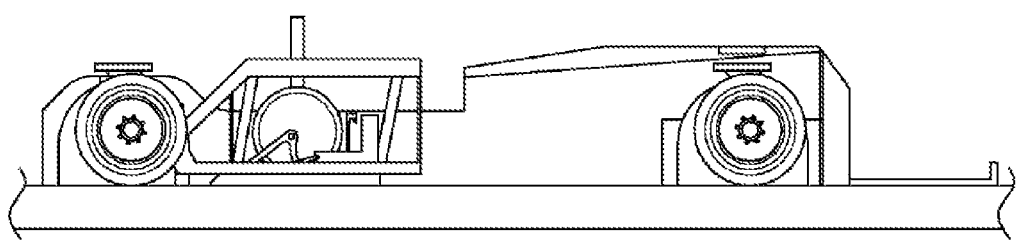
Figure 17:
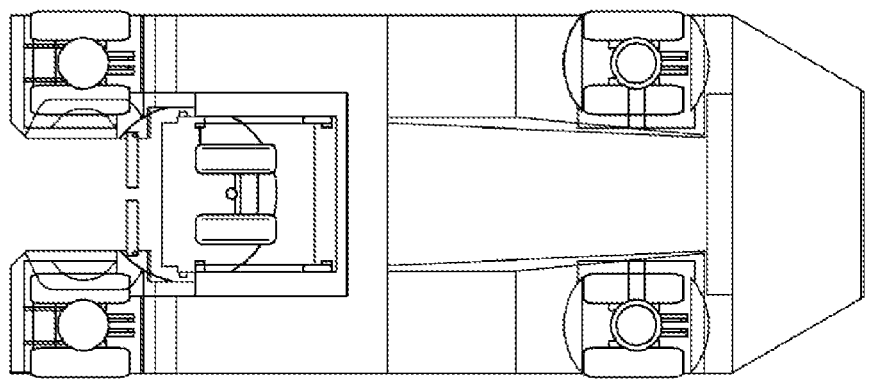

FIGS. 16 and 17 show the wheels of the airplane, which are positioned against the abutment and on the locking device. If necessary, the tractor moves back to allow the wheels of the nose gear of the airplane to be effectively placed against the abutment and on the locking device. The platform being horizontal, i.e. parallel to the ground, there is no force on the nose gear of the airplane, which rolls onto the platform, which is beneficial and preserves the nose gear.

Figure 18:
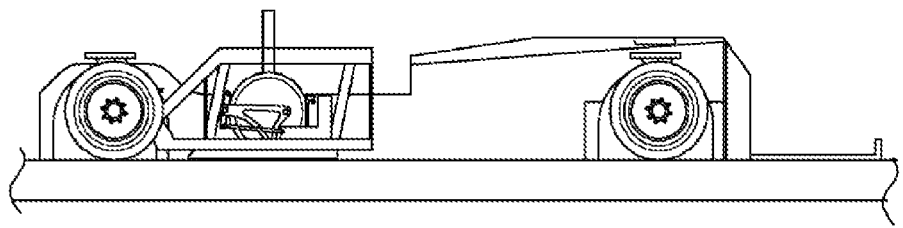
Figure 19:
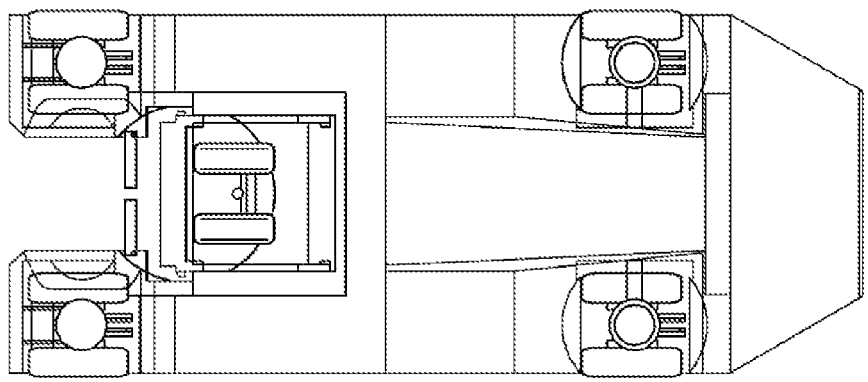

FIGS. 18 and 19 show the following step, which consists of locking the locking system for the wheels of the airplane, as described above in reference to FIG. 2.

Figure 20:
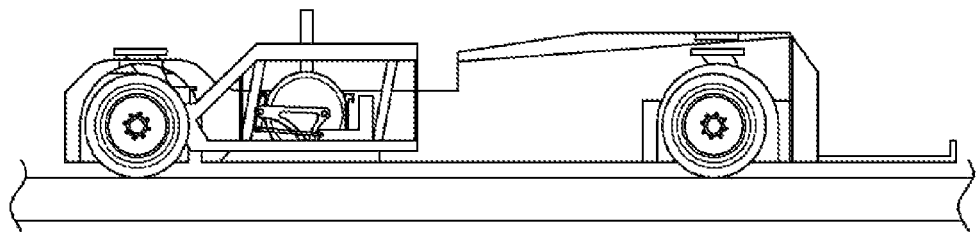
Figure 21:
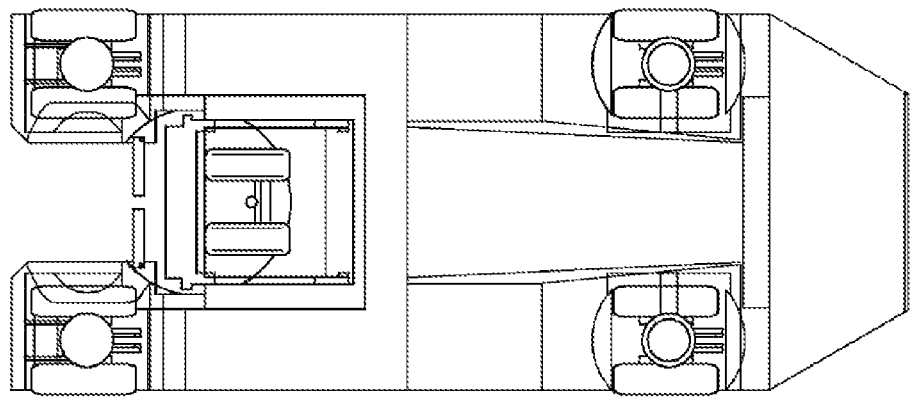

Then, the chassis of the tractor is raised in response to the actuation of the actuators of each of the wheel modules. In FIGS. 20 and 21, all of the wheel modules have raised. At that stage, the gripping platform is still in the gripping position.

Figure 22:
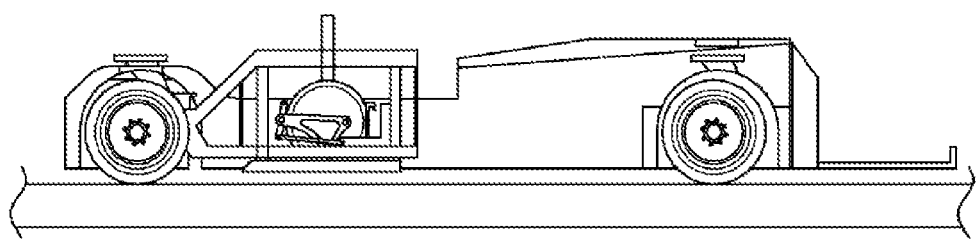
Figure 23:
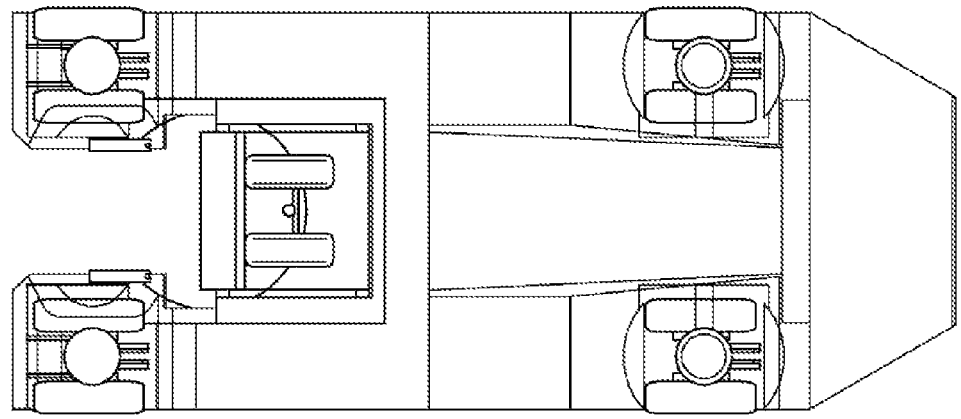

Lastly, as shown in FIGS. 22 and 23, the gripping platform is put in the equilibrium position and the gates are opened. The tractor can now pull the airplane.

When the gripping platform is put in the equilibrium position, it can also be inclined in relation to the horizontal plane if necessary, before the tractor starts to drive. This function is particularly useful in the case of airplanes having a nose gear leg 4 that is inclined in relation to the vertical. The axis of the nose gear is therefore not perpendicular to the horizontal plane. However, upon an action by the airplane's pilot on the direction thereof, the tires must ideally rotate on a plane perpendicular to the axis of the leg 4. The incline of the gripping platform 20 can be ensured using any means described above, by acting either on the length of certain vertical tie rods or on the fastening points thereof to the chassis of the tractor.

The unloading operation is done opposite the loading operation. The brakes of the airplane are applied and the airplane is immobilized.

First, the gripping platform goes into the gripping position. Then, the chassis of the tractor is lowered. Next, the locking system for locking the wheels of the airplane is unlocked. Then, the gripping platform is brought from the gripping position to the shrinking position. The platform pulls out over time so that the wheels of the nose gear of the airplane are oriented off the gripping platform. The tractor advances forward so as to completely free the wheels of the airplane, which is then unloaded.

It appears that the airplane tractor according to the invention has many advantages. First, the operation of the gripping device of the tractor is simple and requires only a limited number of actuators. In particular, the damping and actuating means facilitates the loading of the airplane, but it also makes it possible to pull the airplane at a high speed, since it damps the speed variations of the tractor in relation to the airplane, the latter only having to brake its own mass.

Next, the tractor tolerates breakdowns in that a breakdown of the tractor does not prevent unloading of the airplane. In fact, the actuators are positioned so that nothing opposes the withdrawal of the nose gear of the airplane from the platform. In particular, the actuators can be hydraulic cylinders, which facilitates the movement of elements in the case of a breakdown of the tractor. For example, the gripping platform can be lowered to ground level by emptying the compression chambers of the cylinders. By simple gravity, the chassis of the tractor is lowered. Similarly, the wheel of the nose gear can be removed from the locking device by emptying the compression chambers of the hydraulic cylinders of the locking device. Furthermore, the tightening plate can retract into the platform, which further facilitates the rolling of the nose gear out of the gripping platform. In this way, the tractor according to the invention makes it possible to unload the airplane in the space of several minutes, even in case of breakdown, without any energy contribution other than that necessary for the translation; for example, another vehicle can come pull the broken-down tractor.

Another aim of the invention is to propose a method for pulling an airplane. Document WO/2008/139440, cited above, presents an airplane tractor intended for taxiing operations. This document describes a system in which a transfer signal is provided to the tractor in response to a movement of a control component of the airplane. Notably, the system described in this document comprises a pivoting support (turret) intended to receive the nose gear of the airplane and allowing the transfer of steering controls from the pilot to the tractor. The system described in this document also comprises a shock absorber making it possible to transfer braking commands from the pilot to the tractor. However, the system described in this document comprises a complex gripping system for gripping the nose gear of the airplane, both for loading the gear on the tractor and for unloading. The method according to the invention proposes to use a tractor as described in reference to FIGS. 1 to 5 to pull the airplane. The tractor according to the invention comprises a gripping platform having, together with the chassis, substantially circular translation freedom and connected thereto by a damper-actuator. The tractor according to the invention allows quick loading and unloading of the nose gear of the airplane, as described above, and also makes it possible to pull the airplane toward the takeoff runway.

The steps of this taxiing method are illustrated in FIG. 25. During the phase where the tractor pulls the airplane, i.e. after having loaded the airplane on the tractor, the airplane's pilot controls the braking of the convoy consisting of the airplane and the tractor pulling the airplane. To that end, the pilot can decrease the speed of the convoy using the braking of the airplane, and increase the speed of the convoy by decreasing the braking of the airplane; the tractor managing the acceleration of the convoy. Furthermore, the pilot controls the direction of the convoy.

The first step consists of loading the airplane onto the tractor (S100).

After the airplane has been loaded, the tractor starts to drive. For the tractor to be able to start driving, the pilot releases the primary brakes of the airplane. The resistance force of the airplane is then less than the pulling force of the tractor, which can then drive. The tractor exerts a sufficient pulling force that makes it possible to move the airplane. The tractor accelerates until it reaches a constant cruising speed (S110). For example, when the airplane must be transported toward its takeoff runway, the cruising speed maybe 20 knots, approximately 37 km/h.

The speed of the tractor must, however, be regulated; for example, the pilot must be able to stop the tractor at an intersection. To that end, the method for pulling an airplane controls the speed of the tractor as a function of the pulling force measured by the damping and actuating means (S140). In fact, the damping and actuating means connects the gripping platform with the chassis, so that the pulling force appearing during pulling of the airplane can be measured by the damping and actuating means. In this way, when the pilot of the airplane brakes, this results in increasing the measured pulling force.

The measured force is then compared to a dynamically determined threshold level so as to test whether the threshold level has been exceeded (S150). The threshold level is determined in real-time according to extrinsic parameters of the convoy, such as the wind speed and the slope of the driving plane, and intrinsic parameters of the convoy, such as the type of airplane or model of airplane being pulled. Other parameters can come into play in the real-time determination of the threshold level. As long as this dynamically determined threshold level has not been exceeded, the tractor continues to drive. On the other hand, if this dynamically determined threshold level is exceeded, then the speed of the tractor is reduced (S160). The speed of the tractor is reduced as long as the force measured by the damping and actuating means exceeds the dynamically determined threshold level. On the other hand, the speed of the tractor increases until it reaches the cruising speed when the force measured by the damping and actuating means is again below the threshold level. In this way, the nose gear only undergoes a unidirectional pulling force and no thrust force during braking Airplane builders consider that the forces are overcome enough to make it possible to pull the airplane without risking damaging the nose gear of the airplane.

In practice, the damping and actuating means can be a hydraulic cylinder that comprises at least one sensor capable of measuring a force.

In parallel to controlling the speed of the tractor, the direction thereof is modified by the pilot according to the rotation of the turret in relation to the gripping platform. The rotation of the turret can in fact be induced by a rotational movement of the nose gear of the airplane. In fact, any rotational movement performed by the nose gear of the airplane can be accompanied and transcribed again by the turret, as illustrated in FIG. 24.

FIG. 24 shows a convoy made up of the tractor 1 and the airplane 9. The airplane 9 is loaded on the tractor 1. The abutment is set so that the axis of rotation of the wheel of the nose gear of the airplane and the axis of rotation of the turret coincide and define a shared axis of rotation noted 90 in FIG. 24. The turret has performed a clockwise rotation around the axis of rotation 90 by an angle θ represented in FIG. 24. The turret comprises means capable of measuring the angle of rotation between two successive positions of the turret in relation to the gripping platform. It can for example comprise at least one sensor measuring an angular displacement of the turret in relation to the gripping platform. These measurements can be used to modify the direction of the tractor. The direction of the tractor is modified by rotating the wheel modules of the tractor along an axis of rotation substantially vertical to the chassis of the tractor. In particular, the rotation of each wheel module is specific to it.

The tractor 1 represented in FIG. 24 comprises six wheel modules (3a, 3b, 3c, 3d, 3e, 3f), and each wheel module has a respective angle of rotation. The nose gear of the airplane 9 has rotated by an angle θ on the turret of the gripping platform of the tractor, such that the wheels of the nose gear of the airplane, if they were not loaded on the tractor, would draw a circle with center 94 and radius having the length of the distance comprised between the center 94 and the point 92 situated on the airplane, on the driving plane. Each wheel module (3a, 3b, 3c, 3d, 3e, 3f) has a rotation specific to it that allows the tractor to follow the same direction that the wheels of the nose gear of the airplane would have followed.

It is particularly advantageous that each wheel module has a respective specific rotation. In fact, the tractor changes directions while limiting the risks of parasitic understeering and oversteering, preventing serious incidents where the tractor is jackknifed in relation to the airplane. The longitudinal axis of the airplane is merged with a longitudinal axis of the tractor, and thus there is no relative angle between the airplane and the tractor during a change of direction.

Furthermore, the pilot preserves the sensation of piloting, since the airplane behaves as if the nose gear of the airplane were driving. Notably, if the airplane has a nose gear leg 4 that is inclined in relation to the vertical, the gripping platform 20 can be inclined as described above and the tires will rotate in a plane perpendicular to the axis of the gear leg 4.

Advantageously, the rotation commands of the nose gear of the airplane given by the pilot can be carried out while having the wheels of the nose gear secured on the locking device and without this requiring any action on the locking device.

The angle of rotation between two successive positions of the turret in relation to the gripping platform is measured (S120). The measured angle of rotation makes it possible to estimate the direction the pilot wishes to apply to the airplane. The respective orientations of the wheel modules of the tractor are modified (S130) so as to transcribe again the angle measured in the previous step.

During the phase where the airplane is brought toward the takeoff runway, the pilot steers the tractor in the same way as if the airplane were propelled by its reactors. Advantageously, the method for pulling an airplane according to the invention does not require any modification to the airplane. Furthermore, the operations as they are performed when the airplane moves using its engines are not modified. Lastly, the pilot preserves liability for bringing the airplane to the takeoff runway.

The invention is not limited to the embodiments described as examples. Notably, the contraction and expansion of the cylinders can be reversed if the cylinders are positioned differently. Furthermore, the actuators can be electronically-controlled electric actuators. The locking device can comprise elements other than a plate, connecting rod, and triangle, as long as the tightening of the wheels of the nose gear of the airplane is ensured.

The invention claimed is:

1. An airplane tractor having a gripping system for gripping a nose gear of an airplane, the airplane tractor comprising:
    a chassis;
    wheel modules connected to the chassis, each of the wheel modules including at least one actuator for inducing a vertical movement of the wheel module in relation to the chassis;
    a gripping platform for gripping the nose gear of the airplane, the gripping platform having freedom of movement such that the gripping platform is movable in a substantially pendular movement in relation to the chassis; and
    an actuating means connecting the platform and the chassis, the actuating means including a damping means for damping the freedom of movement of the gripping platform in relation to the chassis.

2. The airplane tractor according to claim 1, further comprising at least one gate intended to oppose a force exerted on at least one wheel of the nose gear of the airplane by the gripping platform.

3. The airplane tractor according to claim 1, wherein the gripping platform comprises a locking device for locking at least one wheel of the nose gear of the airplane.

4. The airplane tractor according to claim 3, wherein the locking device of the at least one wheel of the nose gear is installed on a turret positioned on the gripping platform, the turret rotating freely around a substantially vertical axis in relation to the gripping platform.

5. The airplane tractor according to claim 1, wherein the damping and actuating means comprise a sensor of the relative movement between the gripping platform and the chassis.

6. The airplane tractor according to claim 1, wherein the gripping platform includes a base connected to the chassis by vertical tie rods.

7. A method for gripping a nose gear of an airplane using an airplane tractor, the airplane tractor including a chassis; wheel modules connected to the chassis, each of the wheel modules including at least one actuator for inducing a vertical movement of the wheel module in relation to the chassis; a gripping system for gripping the nose gear of the airplane, the gripping system including a gripping platform being moveable in a substantially pendular movement in relation to the chassis, the gripping platform going from a retracted position to a gripping position by way of an equilibrium position; and a damping and actuating means connecting the gripping platform and the chassis, the method comprising:
    actuating the damping and actuating means to place the gripping platform in the retracted position;
    lowering the chassis;
    moving the airplane tractor so as to place the retracted gripping platform in contact with at least one wheel of the nose gear of the airplane;
    actuating the damping and actuating means to move the gripping platform from the retracted position toward the gripping position while adjusting the height of the chassis by controlling the actuators of at least two wheel modules so as to slide the gripping platform under the wheel;
    raising the chassis; and
    bringing the platform back to the equilibrium position.

8. The method according to claim 7, further comprising closing a gate of the airplane tractor when the gripping platform is in contact with the at least one wheel of the nose gear of the airplane.

9. The method according to claim 8, further comprising opening the gate of the airplane tractor when the chassis raises.

10. The method according to claim 7, further comprising, when the gripping platform has been slid under the wheel, moving the airplane tractor to bring the at least one wheel onto a locking device.

11. The method according to claim 10, further comprising:
    setting the location of an abutment as a function of a type of airplane and/or a type of wheel;
    bringing the at least one wheel onto the locking device against the abutment; and bringing a tightening plate against the wheel to maintain the wheel against the abutment.

* * * * *